United States Patent
Park et al.

(10) Patent No.: US 9,896,349 B2
(45) Date of Patent: Feb. 20, 2018

(54) UV LED PHOTOCATALYSIS WATER PURIFYING DEVICE

(71) Applicant: KOREA INSTITUTE OF ENERGY RESEARCH, Daejeon (KR)

(72) Inventors: Sukin Park, Daejeon (KR); Jae Kyung Yoon, Daejeon (KR); Seung Jae Lee, Daejeon (KR); In Soo Ryu, Daejeon (KR); Gyu Duk Kim, Daejeon (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 0 days.

(21) Appl. No.: 15/291,622

(22) Filed: Oct. 12, 2016

(65) Prior Publication Data
US 2017/0369334 A1    Dec. 28, 2017

(30) Foreign Application Priority Data

Jun. 22, 2016 (KR) .......................... 10-2016-0077731

(51) Int. Cl.
*C02F 1/32* (2006.01)

(52) U.S. Cl.
CPC ........ *C02F 1/325* (2013.01); *C02F 2201/328* (2013.01); *C02F 2201/3222* (2013.01); *C02F 2201/3227* (2013.01); *C02F 2201/3228* (2013.01); *C02F 2305/10* (2013.01)

(58) Field of Classification Search
CPC .............. C02F 1/325; C02F 2201/3221; C02F 2305/10
See application file for complete search history.

(56) References Cited

U.S. PATENT DOCUMENTS

| 4,849,115 A | * | 7/1989 | Cole | ....................... C02F 1/325 |
| | | | | 210/192 |
| 6,447,721 B1 | * | 9/2002 | Horton, III | ............... A61L 2/10 |
| | | | | 210/748.11 |
| 9,112,411 B2 | | 8/2015 | Chae et al. | |
| 2008/0142435 A1 | * | 6/2008 | Kawai | ..................... A61L 9/205 |
| | | | | 210/501 |

(Continued)

FOREIGN PATENT DOCUMENTS

JP    2013244440 A    12/2013
KR    20120020646 A    3/2012
(Continued)

*Primary Examiner* — Jason McCormack
*Assistant Examiner* — Sean Luck
(74) *Attorney, Agent, or Firm* — Harness, Dickey & Pierce, P.L.C.

(57) ABSTRACT

The present invention provides a water purifying device that may include: an upper cover that is configured to have an inlet for liquid; two or more light source modules that are configured to include a light source that emits a UV ray; two or more light guide plates that are configured to guide, to the front, the UV ray that is incident through the lateral side thereof from the light source module to then be output; a purifying plate that is configured to provide a flow path through which liquid flows, and that is configured to provide a plate-type photocatalyst that is disposed on the flow path so that the UV ray emitted from the light guide plate reaches the plate-type photocatalyst in order to thereby purify the liquid; and a lower cover that is configured to have an outlet for the liquid.

8 Claims, 7 Drawing Sheets

(56) References Cited

U.S. PATENT DOCUMENTS

| | | | |
|---|---|---|---|
| 2010/0224562 A1* | 9/2010 | Rolchigo | C02F 1/325 |
| | | | 210/650 |
| 2012/0261319 A1* | 10/2012 | Shinagawa | C02F 1/001 |
| | | | 210/170.03 |
| 2015/0115891 A1 | 4/2015 | Sung et al. | |
| 2015/0274548 A1* | 10/2015 | Elkin | C02F 1/325 |
| | | | 315/111.21 |
| 2015/0344329 A1* | 12/2015 | Smetona | C02F 1/325 |
| | | | 250/437 |
| 2016/0190933 A1 | 6/2016 | Lee et al. | |

FOREIGN PATENT DOCUMENTS

| KR | 20120064524 A | 6/2012 |
|---|---|---|
| KR | 20130015747 A | 2/2013 |
| KR | 2014-0119334 A | 10/2014 |

\* cited by examiner

UV LED PHOTOCATALYSIS WATER PURIFYING DEVICE

CROSS-REFERENCE TO RELATED APPLICATION

This application claims priority from Korean Patent Application No. 10-2016-0077731, filed on Jun. 22, 2016, which is hereby incorporated by reference for all purposes as if fully set forth herein.

BACKGROUND OF THE INVENTION

1. Field of the Invention

The present invention relates to a water purifying device. More particularly, the present invention relates to a device for purifying liquid by using photocatalysis.

2. Description of the Prior Art

Due to the serious environmental pollution, various technologies for purifying contaminated resources have been developed. Particularly, in the case of severe water shortages caused by the environmental pollution, various technologies for purifying the contaminated water have been development.

A technique for purifying water, which has recently been under the spotlight, is a water purifying technique that uses photocatalysis. When a light (in particular, an ultraviolet ray) is irradiated to water that contains a photocatalyst, contaminants may be oxidized or reduced by means of the photocatalyst and the light in order to thereby remove the contaminants contained in the water.

Typically, a water purifying technique that uses a photocatalyst in the form of a powder is well-known, in which a photocatalyst in the form of a powder is input to the contaminated water and then a light is irradiated so that contaminants are oxidized or reduced to then be removed.

However, in the case of using the technology above, an additional process for removing the photocatalyst, which has been input in the form of a powder, is required after the photocatalytic reaction. The photocatalyst that is contained in the water is to be filtered after the photocatalytic reaction for reuse or disposal, so the typical technology essentially adopts the filtering process as described above. Such an additional process may cause an increase in the processing cost, and may reduce the recyclability of the photocatalyst in order to thereby increase the raw material costs.

In order to address the problem above, Korean Patent Publication No. 10-2014-0119334 provides a technique using a photocatalyst in the form of a plate. Korean Patent Publication No. 10-2014-0119334 discloses a water purifying technique that uses a photocatalyst of titania ($TiO_2$) in a structure of a nanotube that grows itself on the surface of a titanium (Ti) support, which does not require the process of removing the photocatalyst in the form of a powder as described in the prior art.

However, the technique disclosed in Korean Patent Publication No. 10-2014-0119334 cannot provide a structure for appropriately irradiating light onto the plate-type photocatalyst. For example, in the technique disclosed in Korean Patent Publication No. 10-2014-0119334, a light is irradiated by using a light source that is positioned above the plate-type photocatalyst. However, it is difficult for such a technique to evenly irradiate light onto the plate-type photocatalyst that extends widely, and it uses a plurality of light sources in order to dispose the light sources in a large area. In addition, according to the technique above, the light is irradiated onto one side of the plate-type photocatalyst while the other side thereof is not used, which is inefficient.

SUMMARY OF THE INVENTION

In this background, the object of the present invention is to provide a technique for efficiently purifying water by using the plate-type photocatalyst.

In order to achieve the above object, the present invention, according to an aspect, provides a water purifying device that may include: an upper cover that is configured to have an inlet for liquid; two or more light source modules that are configured to include a light source that emits a UV ray; two or more light guide plates that are configured to guide, to the front, the UV ray that is incident through the lateral side thereof from the light source module to then be output; a purifying plate that is configured to provide a flow path through which liquid flows, and that is configured to provide a plate-type photocatalyst that is disposed on the flow path so that the UV ray emitted from the light guide plate reaches the plate-type photocatalyst in order to thereby purify the liquid; and a lower cover that is configured to have an outlet for the liquid, wherein the first light guide plate is disposed between the upper cover and the purifying plate while the first light source module is disposed in the lateral side of the first light guide plate, and the second light guide plate is disposed between the lower cover and the purifying plate while the second light source module is disposed in the lateral side of the second light guide plate.

In another aspect, the present invention provides a water purifying device that may include two or more water purifying modules that are configured to include: an upper cover that is configured to have an inlet for liquid, two or more light source modules that are configured to include a light source that emits a UV ray; two or more light guide plates that are configured to guide, to the front, the UV ray that is incident through the lateral side thereof from the light source module to then be output; a purifying plate that is configured to provide a flow path through which liquid flows, and that is configured to provide a plate-type photocatalyst that is disposed on the flow path so that the UV ray emitted from the light guide plate reaches the plate-type photocatalyst in order to thereby purify the liquid; and a lower cover that is configured to have an outlet for the liquid, wherein the first light guide plate is disposed between the upper cover and the purifying plate while the first light source module is disposed in the lateral side of the first light guide plate, and the second light guide plate is disposed between the lower cover and the purifying plate while the second light source module is disposed in the lateral side of the second light guide plate, and wherein an outlet of the first water purifying module and an inlet of the second water purifying module are connected to each other.

As described above, the present invention can effectively purify water by using the plate-type photocatalyst.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," coupled" or "joined" to another component, a third component may be "connected," "coupled," and "joined" between the first and second components, although the first component may be directly connected, coupled or joined to the second component.

Figure 1:
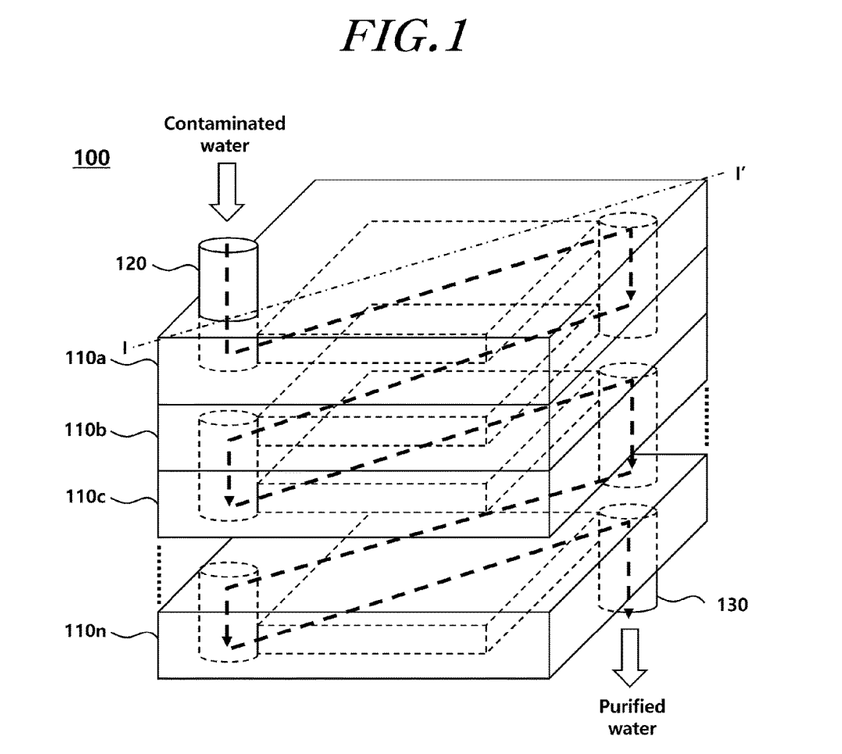
FIG. 1 is a configurational view of a water purifying device, according to an embodiment.

FIG. 1 is a configurational view of a water purifying device, according to an embodiment.

Referring to FIG. 1, the water purifying device 100 may be configured with N water purifying modules 110a, 110b, 110c, . . . , and 110n (N is a natural number) that are stacked.

Water is initially purified by means of the first water purifying module 110a and is transferred to the second water purifying module 110b to then be purified again by means of the second water purifying module 110b. In addition, the water that has been purified in the second water purifying module 110b is transferred to the third water purifying module 110c to then be purified again by means of the third water purifying module 110c. In the same way, the contaminated water is purified through N water purifying modules 110a, 110b, 110c, . . . , and 110n in total, and is finally discharged through the Nth water purifying module 110n.

The water purifying module 110a, 110b, 110c, . . . , and 110n may have the same structure or symmetrical structures to each other. For example, the first water purifying module 110a and the second water purifying module 110b may have the same structure. However, an inlet and an outlet may be disposed to be symmetrical to each other so that the input and output of water can be connected to each other.

In N water purifying modules 110a, 110b, 110c, . . . , and 110n, the contaminated water may flow from the uppermost water purifying module 110a to the lowermost water purifying module 110n according to the free fall energy. At this time, the outlet of the upper layer water purifying module may be connected to the inlet of the lower layer water purifying module.

In addition, for the appropriate input and discharge of water, an input pipe 120 may be connected to the inlet of the first water purifying module 110a, and a discharge pipe 130 may be connected to the outlet of the Nth water purifying module 110n.

Figure 2:
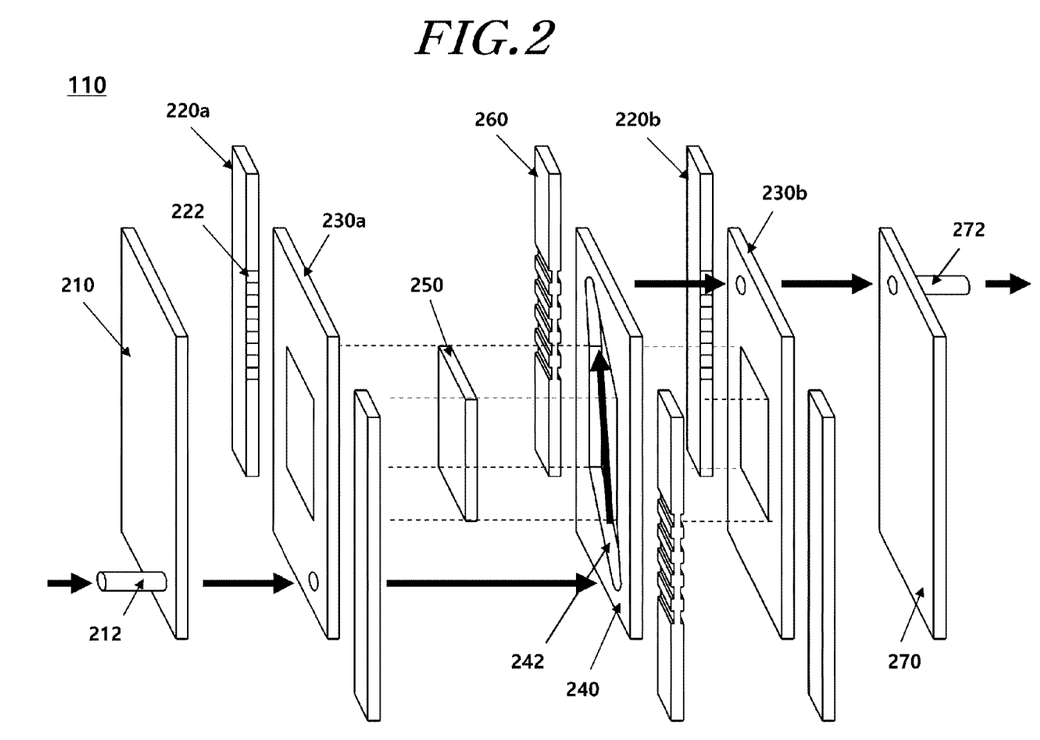
FIG. 2 is an exploded perspective view of a water purifying module, according to an embodiment.
Figure 3:
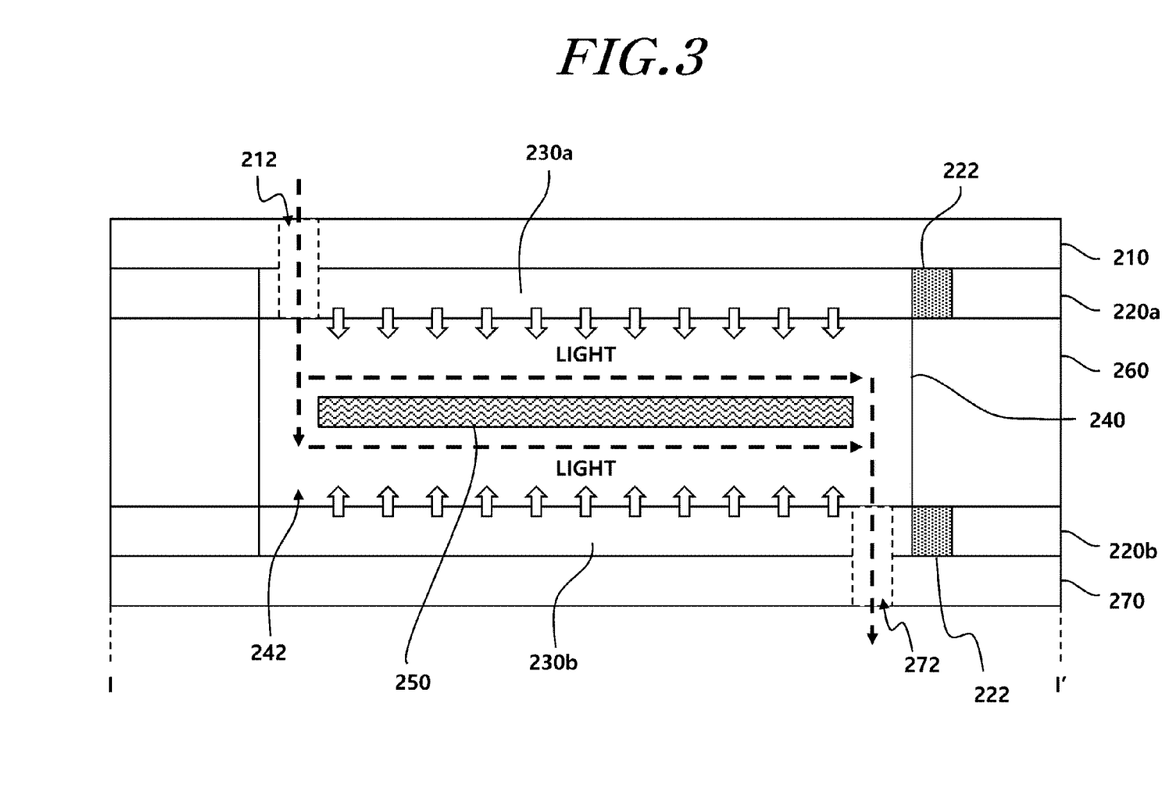
FIG. 3 is a cross-sectional view of a water purifying module according to the line I-I' in FIG. 1.

FIG. 2 is an exploded perspective view of a water purifying module, according to an embodiment, and FIG. 3 is a cross-sectional view of a water purifying module according to the line I-I' in FIG. 1.

Referring to FIGS. 2 and 3, the water purifying module 110 may include an upper cover 210, light source modules 220a and 220b, light guide plates 230a and 230b, a purifying plate 240, a plate-type photocatalyst 250, a heat sink module 260, and a lower cover 270.

An inlet 212 through which liquid is input may be formed in the upper cover 210. The inlet 212 may be formed to protrude to the outside, or may be provided in the form of a hole in the plane cover instead of a protruding form.

The light source modules 220a and 220b include light sources 222 that emit ultraviolet rays.

The light source 222 may be a UV light source. Although all types of light sources that can emit UV rays may be adopted for the light source 222, the following description will be made of an embodiment in which an LED (Light Emitting Diode) is used as the light source 222. The UV LED light source may be implemented in the form of a thin chip in order to thereby reduce the volume of the product.

The water purifying module 110 may include two or more light source modules 220a and 220b. The first light source module 220a of the two or more light source modules 220a and 220b is used to irradiate the purifying plate 240 (in particular, the upper surface of the plate-type photocatalyst 250), and the second light source module 220b thereof is used to irradiate the lower surface of the same. As described above, the water purifying module 110 may use both sides of the plate-type photocatalyst 250 for purifying water by adopting two or more light source modules 220a and 220b in order to thereby improve the efficiency of the water purifying.

The light source modules 220a and 220b are disposed in one side of the water purifying module 110. In addition, light guide plates 230a and 230b are disposed on the light-output paths of the light source modules 220a and 220b in order to thereby evenly irradiate UV rays onto the plate-type photocatalyst 250 even without using a planar light source.

In another aspect, the light guide plates 230a and 230b, instead of the light source modules, are disposed on the front and back sides of the purifying plate 240 (in particular, the plate-type photocatalyst 250). In addition, the light source modules 220a and 220b that emit UV rays are disposed in the lateral sides of the light guide plates 230a and 230b.

The light guide plates 230a and 230b guide, to the front, UV rays that are incident through the lateral sides thereof from the light source modules 220a and 220b to then be output. Then, the output UV rays may be directly transferred to the purifying plate 240.

The water purifying module 110 may include two or more light guide plates 230a and 230b.

At this time, the first light guide plate 230a may be disposed between the upper cover 210 and the purifying plate 240, and the first light source module 220a may be disposed in the lateral side of the first light guide plate 230a.

In addition, the second light guide plate 230b may be disposed between the lower cover 270 and the purifying plate 240, and the second light source module 220b may be disposed in the lateral side of the second light guide plate 230b.

The purifying plate 240 provides a flow path 242 through which liquid flows.

The plate-type photocatalyst 250 is disposed on the flow path 242. In addition, the UV rays emitted from the light guide plates 230a and 230b reach the plate-type photocatalyst 250 so that the liquid may be purified.

Referring to FIG. 3, the positional relationship between the respective configurations on the cross-section view will be described.

The upper cover 210 is positioned in the uppermost layer of the water purifying module, and the first light guide plate 230a is disposed under the upper cover 210 so as to, or so as not to, come in contact with the upper cover 210.

The inlet 212 is formed in the upper cover 210, through which liquid is input, and the inlet 212 may be formed to extend to the first light guide plate 230a. According to the structure above, the liquid that is input from the outside of the upper cover 210 may be transferred to the flow path 242 of the purifying plate through the upper cover 210 and the first light guide plate 230a.

The first light source module 220a may be disposed in the lateral sides of the first light guide plate 230a. The first light source module 220a may include the light source 222, and the light source 222 may be disposed so as to come in contact with the light guide plates 230a and 230b in the light source modules 220a and 220b.

A UV ray emitted from the first light source module 220a is guided to the flow path 242 by means of the first light guide plate 230a to then be output. In terms of an optical path, a UV ray emitted from the first light source module 220a is refracted at about 90 degrees to then be transferred to the flow path 242.

The UV ray that has passed through the first light source module 220a and the first light guide plate 230a irradiate the upper surface of the plate-type photocatalyst 250.

The purifying plate is disposed under the first light guide plate 230a, and at this time, the plate-type photocatalyst 250 is disposed in the purifying plate so as to be parallel with the first light guide plate 230a.

The plate-type photocatalyst 250 is positioned in the central portion of the flow path 242 of the purifying plate. According to the structure above, liquid can flow from the upper side, or from the lower side, of the plate-type photocatalyst 250. At this time, although it is not shown in the drawing, a structure for supporting the position of the plate-type photocatalyst 250 may be further formed on the flow path 242.

The second light guide plate 230b may be disposed under the purifying plate, and the second light source module 220b may be disposed in the lateral side of the second light guide plate 230b.

A UV ray emitted from the second light source module 220b irradiates the lower surface of the plate-type photocatalyst 250 through the second light guide plate 230b.

The lower cover 270 is disposed under the second light guide plate 230b.

The outlet 272 may be formed in the lower cover 270, from which liquid is discharged, and the outlet 272 may be formed to further extend toward the second light guide plate 230b.

According to the structure above, the liquid that has passed through the flow path 242 may be discharged to the outside through the second light guide plate 230b and the lower cover 270.

Figure 4:
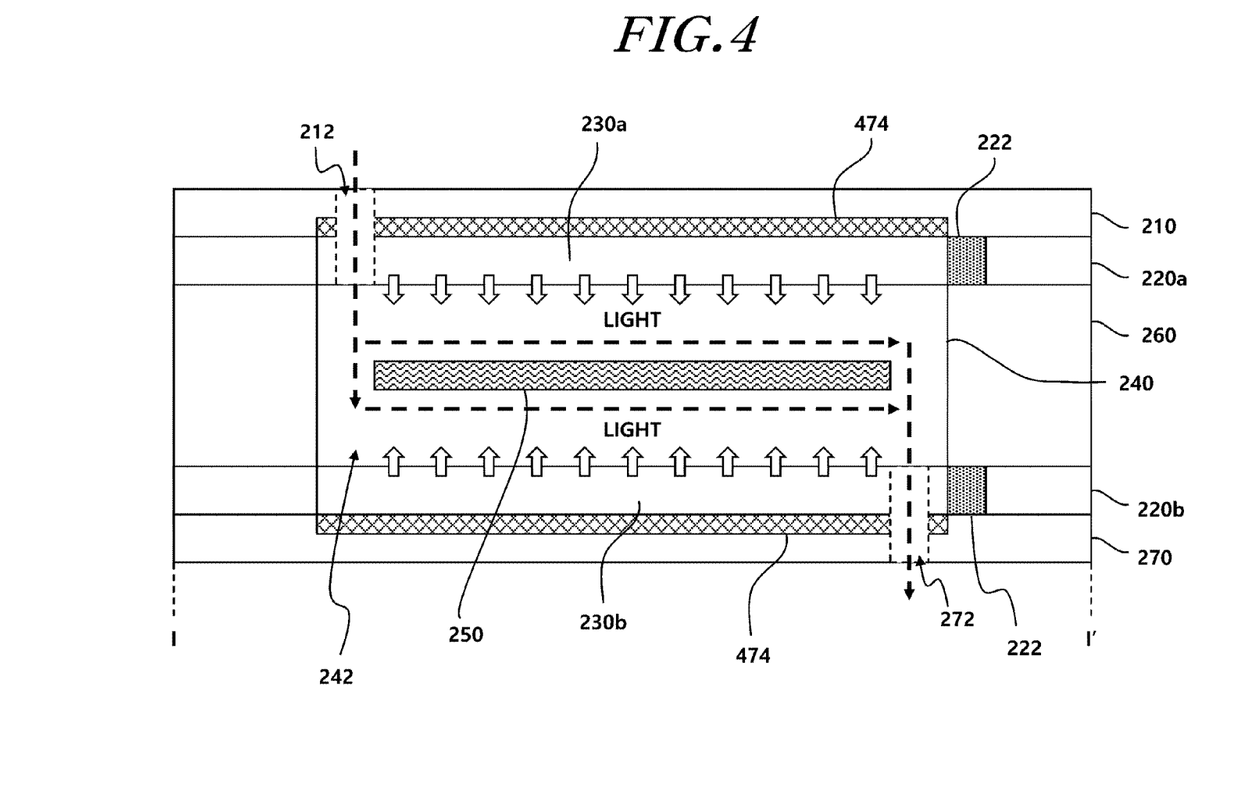
FIG. 4 is a view showing a structure in which a reflector is added to a water purifying module.

FIG. 4 is a view showing a structure in which reflectors are added to the water purifying module.

Referring to FIG. 4, reflectors 474 may be positioned on the sides of the upper cover 210 and the lower cover 270 so as to face the light guide plates 230a and 230b, respectively. The reflector may be made of a metal that has a high reflectivity, such as silver (Ag).

UV rays emitted from the light source modules 220a and 220b are transferred to the plate-type photocatalyst 250 through the light guide plates 230a and 230b, and at this time, the reflectors play the role of reflecting UV rays that are emitted in other directions from the light guide plates 230a and 230b to the plate-type photocatalyst 250.

The reflectors 474 may be positioned in the upper cover 210 and the lower cover 270, or may be positioned on one side of the light guide plate 230a or 230b.

For example, the reflector may be positioned on the side of the first light guide plate 230a, which faces the upper cover 210. Alternatively, the reflector may be positioned on the side of the second light guide plate 230a, which faces the lower cover 270.

Meanwhile, the emission of light from the light source modules 220a and 220b may result in heat.

The heat sink module 260 may radiate heat that is generated in the light source modules 220a and 220b.

The heat sink module 260 may be positioned between the first light source module 220a and the second light source module 220b.

The heat sink module 260 may include a heat sink.

Figure 5:
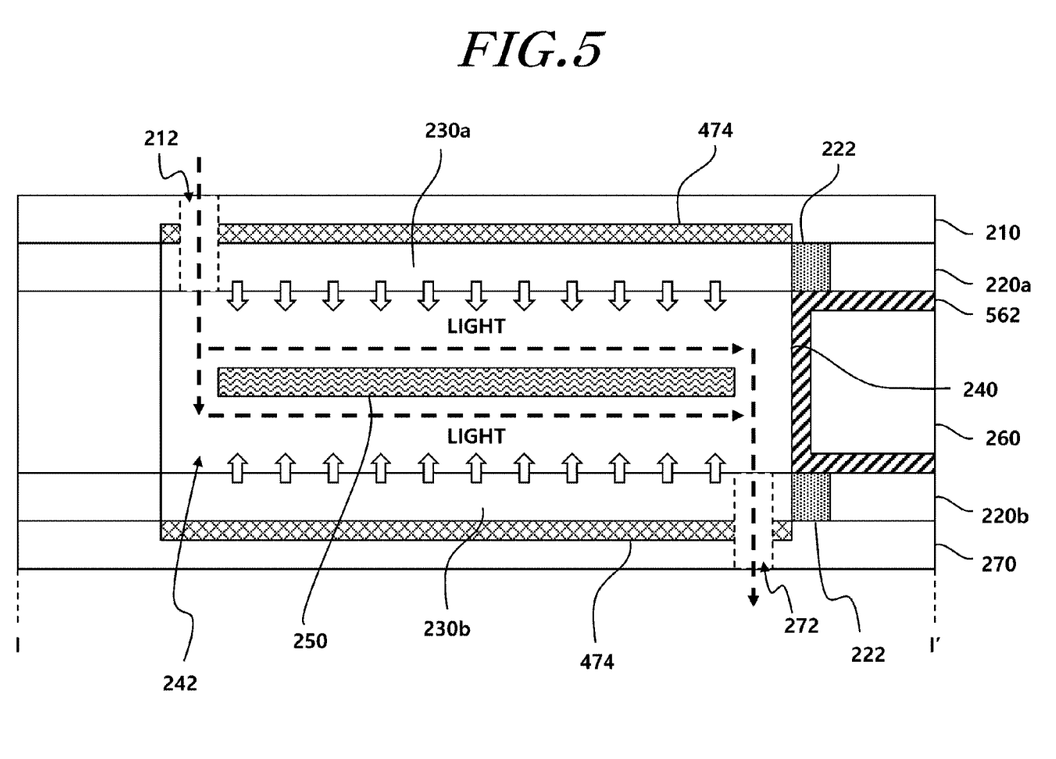
FIG. 5 is a view showing an example of a structure of a heat sink.

FIG. 5 is a view showing an example of a structure of a heat sink.

Referring to FIG. 5, one side of the heat sink 562 may come in contact with the light source module 220a or 220b, and another side thereof may come in contact with the flow path 242 of the purifying plate.

Water flows through the flow path 242. Thus, since the heat sink 562 comes in contact with the flow path 242, water-cooling type heat dissipation is possible.

Figure 6:
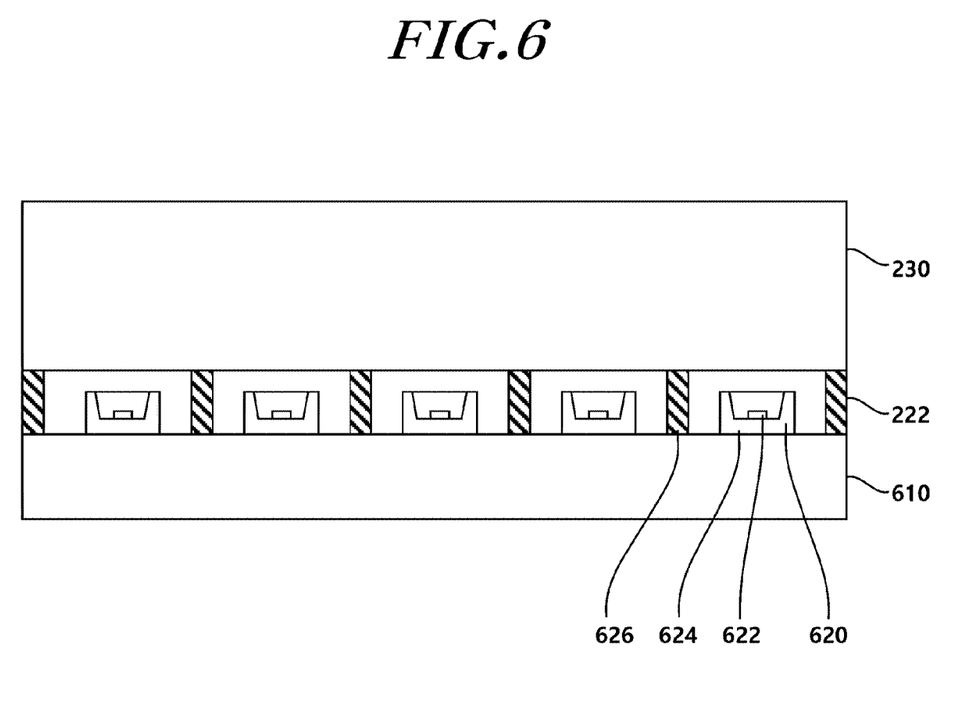
FIG. 6 is a view showing a structure in which an LED module is used.

The light source 222 may be composed of an LED module.

FIG. 6 is a view showing a structure in which an LED module is used.

Referring to FIG. 6, the light source module may include a printed circuit board 610 and a light source 222, and the light source 222 may be comprised of a plurality of LED modules 620 and pads 626.

The LED module 620 may include a mold 624 that has a groove formed therein and an LED chip 622 that is placed in the groove.

A plurality of LED modules 620 may be attached to the printed circuit board 610 so as to protrude toward the light guide plate 230. However, since the LED module 620 is easily damaged by impact, the pad 626 may play the role of a buffer to prevent the LED module 620 from being in direct contact with the light guide plate 230.

Since the thickness of the LED module 620 is less than the pad 626 that is positioned between the printed circuit board 610 and the light guide plate 230, the LED module 620 may be prevented from being in direct contact with the light guide plate 230.

Figure 7:
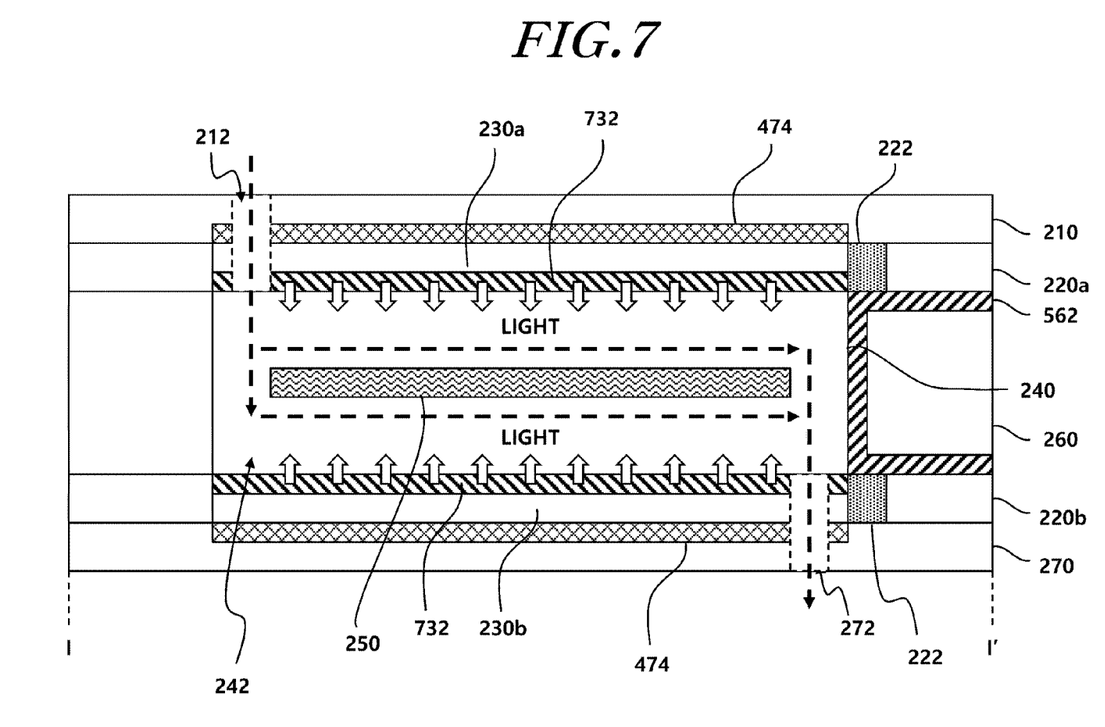
FIG. 7 is a view showing a structure in which an optical sheet is further disposed on a light guide plate.

Meanwhile, the light guide plates 230a and 230b may further adopt optical sheets.

FIG. 7 is a view showing a structure in which optical sheets are further disposed in the light guide plate.

Referring to FIG. 7, optical sheets 732 may be provided on the sides of the light guide plates 230a and 230b so as to face the purifying plate, respectively. The optical sheets 732 may play the role of diffusing the UV rays emitted from the light guide plates 230a and 230b to the purifying plate.

The water purifying device, according to an embodiment, has been described above. The water purifying device above can evenly irradiate UV rays onto the plate-type photocatalyst with few light sources by using a structure of the light source module and the light guide plate. In addition, the water purifying device above can irradiate UV rays onto the lower surface of the plate-type photocatalyst, as well as the upper surface thereof, by using two or more light source modules and light guide plates so that the plate-type photocatalyst can be efficiently used.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A water purifying device comprising:
   at least three plate-like sterilizing modules in a stack, the modules comprising:
      a stack of rectangular flat plates, with at least a first plate, a second plate, a third plate, a fourth plate, and a fifth plate arranged in order;
      wherein the first plate in the stack is an upper cover configured to have an inlet for a liquid in a first corner;
      wherein the second plate in the stack is a first light guide with a first UV light emitting module disposed along at least one lateral edge, and configured to conduct light from the first module to a face of the first light guide towards the third plate in the stack;
      wherein the third plate in the stack is a purifying plate that receives the liquid from the first plate and outputs the liquid to the fifth plate, and receives UV light from the second plate and a fourth plate, wherein the third plate is configured with a flow path that is rectangular and flows the liquid from the first corner to the opposite and nonadjacent second corner, and wherein a plate-type photocatalyst disposed in the middle of the flow path;
      wherein the fourth plate in the stack is a second light guide with a second UV light emitting module disposed along at least one lateral edge and configured to conduct light from the second module to a face of the second light guide towards the third plate in the stack;
      wherein the fifth plate in the stack is a lower cover configured to have an outlet for the liquid in the second corner;
      wherein each module receives liquid in its inlet and passes it to its outlet such that the direction of flow of the liquid is alternated to create a serpentine-like flow path through the at least three plate-like sterilizing modules of the water purifying device.

2. The device according to claim 1, further comprising in each sterilizing module reflectors positioned on the upper cover and the lower cover so as to face the light guide plate.

3. The device according to claim 1, further comprising in each sterilizing module a reflector positioned on one side of the light guide plate.

4. The device according to claim 1, further comprising in each sterilizing module a heat sink module that is configured to be disposed between the first light source module and the second light source module to radiate the heat generated from the light source.

5. The device according to claim 1, further comprising in each sterilizing module a heat sink of which one side comes in contact with the light source module and of which another side comes in contact with the flow path of the purifying plate.

6. The device according to claim 1, wherein the light source in each sterilizing module is an LED (Light Emitting Diode) module, and the LED module comprises a mold that is formed with a groove and an LED chip that is placed in the groove.

7. The device according to claim 6, further comprising in each sterilizing module a pad positioned between a printed circuit board to which the LED module is attached and the light guide plate, and the thickness of the LED module is less than the pad so that the LED module is not in contact with the light guide plate.

8. The device according to claim 1, further comprising in each sterilizing module an optical sheet that is provided on the side of the light guide plate so as to face the purifying plate, and that diffuses the UV ray emitted from the light guide plate.

* * * * *